United States Patent
Shin et al.

(10) Patent No.: US 8,169,415 B2
(45) Date of Patent: May 1, 2012

(54) TOUCH SENSOR DEVICE

(75) Inventors: Young-Ho Shin, Yongin-si (KR); Bang-Won Lee, Yongin-si (KR); Du-Su Shin, Yongin-si (KR)

(73) Assignee: Atlab Inc. (KR)

( * ) Notice: Subject to any disclaimer, the term of this patent is extended or adjusted under 35 U.S.C. 154(b) by 357 days.

(21) Appl. No.: 12/517,012

(22) PCT Filed: Aug. 22, 2007

(86) PCT No.: PCT/KR2007/004022
§ 371 (c)(1),
(2), (4) Date: May 29, 2009

(87) PCT Pub. No.: WO2008/066237
PCT Pub. Date: Jun. 5, 2008

(65) Prior Publication Data
US 2010/0072916 A1   Mar. 25, 2010

(30) Foreign Application Priority Data
Dec. 1, 2006   (KR) .................. 10-2006-0120487

(51) Int. Cl.
*G06F 3/041* (2006.01)
(52) U.S. Cl. ........ 345/173; 345/104; 345/174; 345/178; 315/291
(58) Field of Classification Search .................. 315/291; 345/104, 173, 174, 178; 340/407.1; 200/600
See application file for complete search history.

(56) References Cited

U.S. PATENT DOCUMENTS

| 5,159,159 A | * | 10/1992 | Asher | 178/18.05 |
| 6,631,192 B1 | | 10/2003 | Fukiharu | |
| 6,788,295 B1 | | 9/2004 | Inkster | |
| 6,856,259 B1 | | 2/2005 | Sharp | |
| 2004/0238726 A1 | * | 12/2004 | Caldwell | 250/221 |
| 2006/0244693 A1 | * | 11/2006 | Yamaguchi et al. | 345/76 |
| 2007/0132739 A1 | * | 6/2007 | Felder | 345/173 |
| 2009/0021268 A1 | * | 1/2009 | Liao et al. | 324/686 |
| 2009/0231167 A1 | * | 9/2009 | Chen | 341/22 |
| 2009/0295760 A1 | * | 12/2009 | Linge et al. | 345/179 |

FOREIGN PATENT DOCUMENTS

| JP | 61-112428 | 7/1986 |
| KR | 10-2000-0009556 | 2/2000 |
| KR | 10-2005-0013851 | 2/2005 |

OTHER PUBLICATIONS

International Search Report for PCT/KR2007/004022 dated Nov. 26, 2007.
Written Opinion for PCT/KR2007/004022 dated Nov. 26, 2007.
Japanese Office Action—Japanese Application No. 2009-539171 issued on Oct. 4, 2011, citing JP 59-202030.

* cited by examiner

*Primary Examiner* — Douglas W Owens
*Assistant Examiner* — Thai Pham
(74) *Attorney, Agent, or Firm* — Cantor Colburn LLP

(57) ABSTRACT

Provided is a touch sensor device including: at least one terminal connected to at least one contact pad; at least one common terminal; at least one light emitter connected between the common terminal and the terminal; and a touch sensor and light-emission controller unit connected to the common terminal and the terminal, and when a touch is sensed by the contact pad, controlling a corresponding light emitter to emit light.

32 Claims, 2 Drawing Sheets

[Fig. 3]
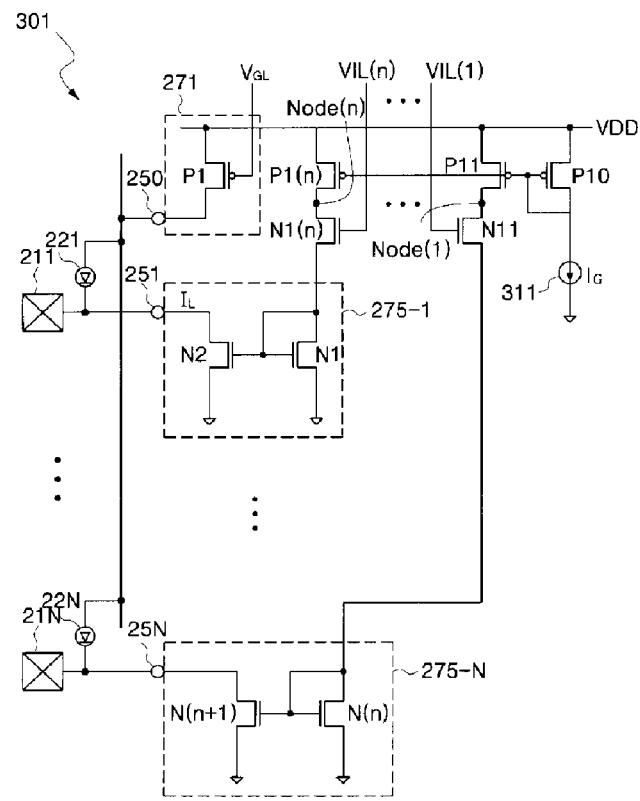
[Fig. 4]
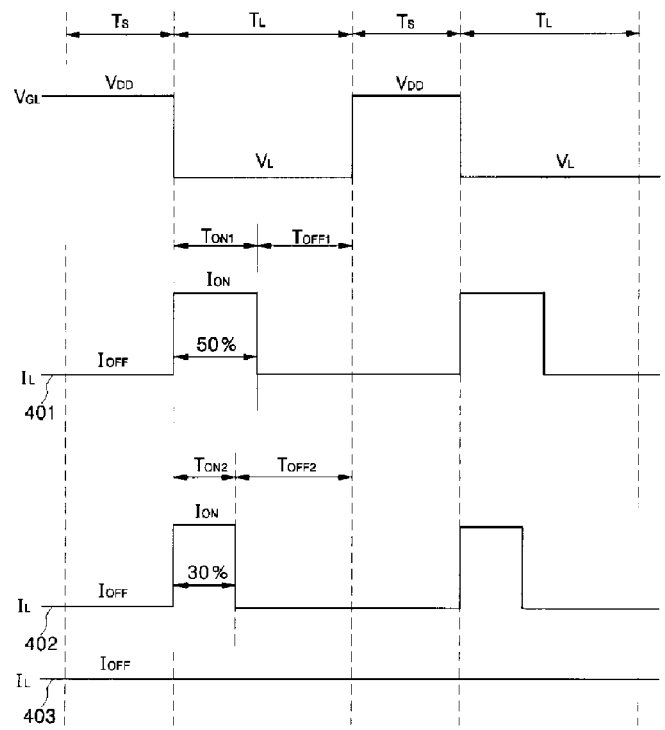

TOUCH SENSOR DEVICE

TECHNICAL FIELD

The present invention relates to a touch sensor device, and more particularly, to a touch sensor device having a reduced number of input/output (I/O) terminals.

BACKGROUND ART

A general touch sensor device has a plurality of separate input/output (I/O) terminals for receiving an input generated by external touch, driving an externally arranged light-emitting device such as a light emitting diode (LED), and communicating to external control device FIG. 1 is a block diagram showing a configuration of a conventional touch sensor device.

A touch sensor device 101 comprises a light-emitting device driver 125, a touch sensor 130, and a controller 135. In addition, the touch sensor device further comprises a plurality of output terminals 161-3 to 16N-3 for outputting a signal to external light-emitting devices 150 to 15N, and a plurality of I/O terminals 181 to 18N for receiving and outputting a signal from/to an external contact unit 170.

The contact unit 170 arranged adjacent to one side of the touch sensor device 101 has a plurality of typical contact pads 171 to 17N, and a light-emitting unit 140 arranged adjacent to another side of the touch sensor device 101 has a plurality of light-emitting devices 150 to 15N having LEDs 150-1 to 15N-1 and resistors 150-2 to 15N-2.

Functions of the respective blocks shown in FIG. 1 will now be described below.

In response to signals output from the contact pads 171 to 17N, the touch sensor 130 generates and outputs a touch detection signal touch_info to the controller 135.

In response to the touch detection signal touch_info output from the touch sensor 130, the controller 135 outputs a control signal for driving the corresponding light-emitting device to the light-emitting device driver 125 and communicating to external control device 150.

The LEDs 150-1 to 15N-1 of the light-emitting unit 140 are controlled by a control signal output from the light-emitting device driver 125. The control signal is output according to a combination of signals sig1 to sigN respectively output from the contact pads 171 to 17N. For example, the touch detection signal touch_info is generated by the touch sensor 130 in response to the signal sig1 output from the contact pad 171, a predetermined current is applied to the LED 150-1 in response to the touch detection signal touch_info, and thus the LED 150-1 is turned on.

The number of the externally arranged contact pads 171 to 17N is determined according to the number of inputs that must be applied by touch. For example, an input unit for controlling functions of a specific electronic device must have a plurality of contact pads according to the number of required inputs. With the trend of electronic devices to have high quality and high performance, the number of functions to be controlled is increasing together with the number of the contact pads 171 to 17N for processing an input generated by external touch.

Here, when input is performed through contact pads, some electronic devices may inform a user that input is being performed. In the case of a general cellular phone, when input is performed through contact pads for making a phone call, inner LEDs are driven to notify a user that input is being performed.

Conventionally, with an increase in the number of contact pads, the number of light-emitting devices having connected LEDs also increases. Thus, in the touch sensor device 101 of FIG. 1, the number of the I/O terminals 181 to 18N and the number of the output terminals 161-3 to 16N-3 must increase. However, since the number of I/O terminals of the touch sensor device 101 is limited, the numbers of external contact pads and light-emitting devices that can be connected to the I/O terminals also are limited.

Therefore, a new touch sensor device is necessary which performs the same operation while having a reduced number of I/O terminals by improving a touch sensor device structure.

DISCLOSURE

Technical Problem

The present invention is directed to a touch sensor device having a reduced number of input/output (I/O) terminals, by controlling an external contact pad, and a light-emitting device commonly connected to the same I/O terminal.

Technical Solution

One aspect of the present invention provides a touch sensor device comprising: at least one terminal connected to at least one contact pad; at least one common terminal; at least one light emitter connected between the common terminal and the terminal; and a touch sensor and light-emission controller unit connected to the common terminal and the terminal, and when a touch is sensed by the contact pad, controlling a corresponding light emitter to emit light.

The touch sensor and light-emission controller unit may comprise: a touch sensor for recognizing a signal applied to the terminal and outputting touch detection signals in response to a first control signal during a first time period; a light-emitting device controller for controlling a current to flow from the common terminal through a selected terminal in response to a second control signal during a second time period; and a controller for outputting the first control signal to the touch sensor and generating the second control signal in response to the respective touch detection signals.

The touch sensor may output the touch detection signals to the controller in response to the first control signal during the first time period, output a high impedance value to the terminal, and control the contact pad not to output a signal in response to the second control signal during the second time period.

The light-emitting device controller may comprise: at least one light-emission flicker connected between a supply voltage and the common terminal, and connected with the light emitter; and a light-emitting device driving unit making the current flow to the terminal and applying a light-emission control voltage to the light-emission flicker in response to the second control signal.

The light-emission flicker may have a p-type metal oxide semiconductor (PMOS) transistor turned on in response to a voltage.

The light-emitting device driving unit may output a high impedance value to the terminal in response to the first control signal during the first time period. In addition, the light-emitting device driving unit may comprise: a constant current source; a first PMOS transistor connected between the supply voltage and the constant current source; a plurality of second PMOS transistors each constituting a current mirror circuit together with the first PMOS transistor and connected with the supply voltage; and a first n-type metal oxide semiconductor (NMOS) transistor connected to the respective second PMOS transistors and turned on in response to the second control signal. The light-emitting device driving unit may further comprise a light-emitting device driver comprising: a second NMOS transistor connected between the first NMOS transistor and a ground voltage; and a third NMOS transistor connected between the input/output (I/O) terminal and the ground voltage and constituting a current mirror circuit together with the second NMOS transistor.

The light-emitting device driver may apply a level of current with which the light emitter can emit light in response to the second control signal during the second time period.

The controller may control a duration in which the second control signal is maintained at a uniform value during the second time period in response to the touch detection signals or an external control signal. In addition, the first time period may be shorter than the second time period. The frequencies of the first control signal and the second control signal having a time interval consisting of the first time period and the second time period may be equal to or higher than a frequency at which an ordinary person can tell whether or not light is continuously emitted with his/her naked eye.

The touch sensor may output the touch detection signals, generated according to whether or not the contact pad senses touch or pressure, to the controller.

The light emitter may comprise a light emitting diode (LED), or a light-emitting device and a diode.

Another aspect of the present invention provides a touch sensor device comprising: at least one terminal connected to at least one contact pad; at least one common terminal; at least one light emitter connected between the common terminal and the terminal; a touch sensor and light-emitting device controller unit recognizing a signal applied to the terminal and generating a touch detection signal in response to a first control signal, and controlling a current to flow through a selected terminal in response to a second control signal; and a controller generating the first and second control signals.

The controller may output the first control signal to the touch sensor and light-emitting device controller unit at intervals consisting of a first time period and a second time period, and generate the second control signal in response to the touch detection signal.

The touch sensor and light-emitting device controller unit may comprise: a touch sensor for recognizing the signal applied to the terminal and outputting the touch detection signal in response to the first control signal during the first time period; and a light-emitting device controller for controlling the current to flow from the common terminal through the selected terminal in response to the second control signal during the second time period.

ADVANTAGEOUS EFFECTS

The touch sensor device of the present invention connects an external touch sensor device and a light-emitting device to each input/output (I/O) terminal in common and controls each of them. Therefore, it is possible to reduce the number of I/O terminals, thus reducing production cost. In addition, it is possible to manufacture small sized touch sensor devices, thus enabling the miniaturization of portable electronic devices.

DESCRIPTION OF DRAWINGS

FIG. 3 is a circuit diagram showing a part of the touch sensor device of FIG. 2; and FIG. 4 is a timing diagram showing operation of the touch sensor device of FIG. 2.

MODES OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Figure 2:
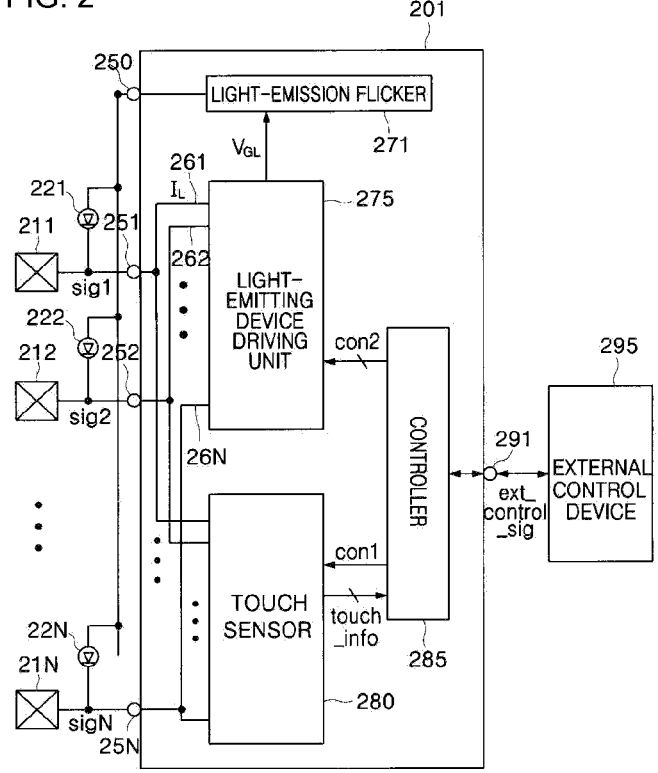
FIG. 2 is a block diagram showing a configuration of a touch sensor device according to an exemplary embodiment of the present invention.

FIG. 2 is a block diagram showing a configuration of a touch sensor device according to an exemplary embodiment of the present invention.

A touch sensor and light-emission controller unit includes a light-emission flicker 271, a light-emitting device driving unit 275, a touch sensor 280, and a controller 285. Here, N is an arbitrary natural number. Contact pads 211 to 21N and light emitting diodes (LEDs) 221 to 22N, which are light-emitting units, are commonly connected to a plurality of input/output (I/O) terminals 251 to 25N, respectively. And, the plurality of input/output (I/O) terminals 251 to 25N are connected to the light-emitting device driving unit 275 and the touch sensor 280 via respective connection lines 261 to 26N. The light-emission flicker 271 is commonly connected to the LEDs 221 to 22N through a terminal 250, or arranged adjacent to the exterior and connected to the LEDs 221 to 22N. In addition, the touch sensor and light-emission controller unit comprises an I/O terminal 291 connected with an external control device 295.

$V_{GL}$ denotes a light-emission control voltage applied to the light-emission flicker 271, $I_L$ denotes a current applied to the LEDs 221 to 22N, sig1 to sigN denote signals generated by the contact pads 211 to 21N, touch_info denotes a touch detection signal, con1 denotes a first control signal output to the touch sensor 280, con2 denotes a plurality of second control signals output to the light-emitting device driving unit 275, and ext_control_sig denotes an external control signal.

Detailed operation of the blocks shown in FIG. 2 will now be described.

The touch sensor 280 generates and outputs the touch detection signal touch_info to the controller 285 in response to the signals sig1 to sigN that are output from the contact pads 211 to 21N in response to the first control signal con1 output from the controller 285 during a first time period. Here, the contact pads 211 to 21N may sense the pressure of a touch, as well as information as to whether or not a touch is made, and output the signals sig1 to sigN.

The light-emitting device driving unit 275 controls the respective LEDs 221 to 22N in response to the external control signal ext_control_sig output from the external control device 295 and the second control signals con2 output from the controller 285 during a second time period. Here, the light-emitting device driving unit 275 includes light-emitting device drivers (not shown) respectively connected to the I/O terminals 251 to 25N. An exemplary embodiment of the light-emitting device drivers will now be described in detail with reference to FIG. 3. Light-emitting device drivers 275-1 to 275-N of FIG. 3 respectively control whether or not the LEDs 221 to 22N emit light through the I/O terminals 251 to 25N connected in common and, as a protection circuit of the LEDs 221 to 22N, output a predetermined level of current to the LEDs 221 to 22N.

The light-emission flicker 271 is connected to all the light-emitting devices and performs the light-emitting operation of the light-emitting devices in response to a predetermined level of the supply voltage $V_{GL}$ for controlling all the light-emitting devices.

In response to the touch detection signals touch_info output from the touch sensor 280 and the external control signal ext_control_sig, the controller 285 outputs the second control signals con2, which control a duration in which the predetermined amount of current is applied to the corresponding LED among the LEDs 221 to 22N connected to the light-emitting device driving unit 275, and the first control signal con1, which controls operation of the touch sensor 280. While the single light-emission flicker 271 has been described as being connected to all the LEDs for convenience of illustration, it will be easily understood that a plurality of light-emission flickers may be arranged for separately controlling the LEDs. Also, while the LEDs have been described as being connected to all the I/O terminals 251 to 25N, it will be easily understood that the LEDs may be connected only to some of the I/O terminals 251 to 25N, if necessary.

The touch sensor device according to an exemplary embodiment of the present invention performs a touch signal recognition operation and a light emitting control operation which are two different operations by the contact pads respectively connected to the I/O terminals 251 to 25N, and light emission of the LEDs that are light-emitting devices. The two operations will now be described below.

During the first time period in which the contact sensor 280 is controlled, the contact pads 211 to 21N respectively generate the predetermined signals sig1 to sigN in response to the first control signal con1 and a touch. In addition, the contact pads 211 to 21N may recognize the pressure of the external touch and generate the predetermined signals sig1 to sigN. Here, the LEDs 221 to 22N are turned off because the light-emitting device driving unit 275 does not output the current $I_L$, or in response to the high level voltage $V_{GL}$ output from the light-emission flicker 271.

In addition, during the predetermined second time period in which the light-emitting device driving unit 275 is controlled, whether or not the LEDs 221 to 22N are turned on is determined in response to the second control signals con2 output from the controller 285.

More specifically, during the first time period in which an external touch is recognized, the contact pads 211 to 21N connected with the touch sensor 280 output the touch signals sig1 to sigN in response to the first control signal con1. Here, in response to the second control signals con2, the light-emitting device driving unit 275 drives outputs to the I/O terminals 251 to 25N in a high impedance state, thereby temporarily open-circuiting between the I/O terminals 251 to 25N and the light-emitting device driving unit 275. The signals sig1 to sigN input to the touch sensor 280 are converted into the touch detection signal touch_info and output to the controller 285.

On the other hand, during the second time period, the contact pads 211 to 21N do not output the touch signals sig1 to sign after recognizing the touch in response to the first control signal. Thus, the touch sensor 280 does not process an external touch during the second time period to indicate that it is time for controlling the LEDs. Here, in response to the first control signal con1, the touch sensor 280 drives outputs from the respective I/O terminals 251 to 25N in a high impedance state, thereby temporarily open-circuiting between the I/O terminals 251 to 25N and the touch sensor 280. In this way, a collision between voltage applied to the light-emitting devices 221 to 22N and the outputs of the touch sensor 280 is prevented.

In response to the respective second control signals con2 that have been input, the light-emitting device drivers (not shown) included in the light-emitting device driving unit 275 adjust a duration in which the predetermined level of current is applied to the corresponding LED during the second time period, and control whether or not the respective LEDs 221 to 22N are turned on. The controller 285 outputs the second control signals con2, whereby whether or not to turn on the corresponding LED among the LEDs 221 to 22N is determined, to the light-emitting device driving unit 275 in response to whether or not the touch detection signal touch_info is generated. In response to the second control signals con2, a predetermined current is applied to the light-emitting device drivers (not shown).

When no touch is made, the touch sensor 280 does not output the touch detection signal touch_info. Thus, the controller 285 outputs the second control signals con2 so that the current is not applied to the corresponding terminal commonly connected with the LED and the contact pad to which no touch has been made. Since the current $I_L$ is not applied to the corresponding terminal, the corresponding LED is turned off. Otherwise, in response to the second control signals con2, the light-emitting device driving unit 275 may apply the high level voltage $V_{GL}$ to the light-emission flicker 271, thereby turning off all the LEDs 221 to 22N when no touch is made. In this exemplary embodiment, LEDs are turned off when no touch is made, but specific LEDs may be programmed to turn on. Needless to say, such a function may be implemented in the controller 285 or by the external control device 295.

In another exemplary embodiment of the present invention, the respective contact pads 211 to 21N may have inner clock generators (not shown) and may be controlled not to output the touch signals sig1 to sigN in response to a touch or pressure with reference to a clock during a specific time period. When an external touch is made during another time period, the touch signals sig1 to sigN are output. In this case, the contact pads 211 to 21N are not controlled by the first control signal con1 output from the controller 285 to the touch sensor 280. However, the light-emitting device driving unit 275 and the light-emission flicker 271 operate in response to the respective second control signals con2 output from the controller 285, as described above.

In this way, since the LEDs must be turned off during the first time period for recognizing an external touch, a user recognizes discontinuous light from the LEDs. To solve this problem, respective frequencies of the first and second control signals con1 and con2 are made to be the same as or higher than a frequency that can be distinctively recognized by people, when one period consists of the first time period in which the touch is recognized and the second time period in which the LEDs are controlled.

Assuming that an image retention time of an ordinary human eye is $\frac{1}{16}$ second, a naked human eye can perceive a screen which is turned on and off in a shorter time interval than $\frac{1}{16}$ second to be a continuous screen. Therefore, when the turn-on and off operations of LEDs are repeated at a frequency that is equal to or more than the frequency that ordinary people can recognize, the LEDs are perceived to be continuously turned on.

A time for applying the corresponding current $I_L$ of FIG. 2 is adjusted to control a turn-on duration of an LED, thereby changing a color intensity emitted to outside. For example, in order to make a specific color intensity, when the turn-on duration of the LED 221 must be adjusted to be 30% of the entire LED control time, the light-emitting device drivers (not shown) included in the light-emitting device driving unit 275 adjust respective durations for applying the current $I_L$ to the LEDs 221 to 22N according to durations in which the respective second control signals con2 are maintained at specific values during the second time period. In other words, the second control signals con2 are output to control the application time and level of the output current $I_L$, so that the LED 221 is turned on during one time period in the time for controlling the LED 221 and turned off during the other time period in the entire LED control time.

According to the brightness combination of lights respectively emitted by the LEDs, it is possible to emit light of various colors. Since the LEDs connected to the touch sensor device of the present invention are controlled to repeat the turn-on and off operations in consideration of a specific frequency that people can perceive, whether or not the corresponding LED emits light may be determined by adjusting a duration in which the LED is actually turned on in one period.

Figure 1:
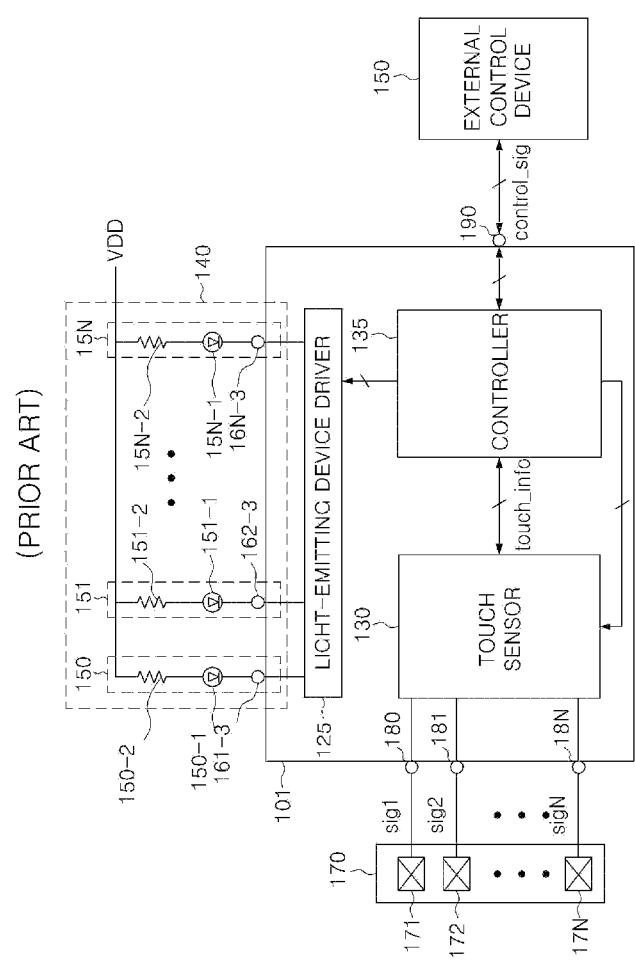
FIG. 1 is a block diagram showing a configuration of a conventional touch sensor device.

As described above, the touch sensor device of FIG. 2 has a touch signal recognition function as well as a light-emitting control function by connecting the LEDs 221 to 22N and the contact pads 221 to 21N to the same I/O terminals 251 to 25N and connection lines 261 to 26N, unlike the conventional touch sensor device of FIG. 1.

FIG. 3 is a circuit diagram showing a part of the touch sensor device of FIG. 2. Aspects of the configuration shown in FIG. 3 that are the same as in FIG. 2 will not be described again.

A part 301 of the touch sensor and light-emission controller unit is a part of a circuit for controlling the light-emitting devices. The part 301 comprises the light-emission flicker 271 connected to a common terminal 250, the light-emitting device drivers 275-1 to 275-N in the light-emitting device driving unit 275 respectively connected to the I/O terminals 251 to 25N, a constant current source 311, the contact pads 211 to 21N, and the LEDs 221 to 22N.

Whether or not the LEDs 221 to 22N are turned on is determined in response to the level of voltage and current applied according to their unique electrical characteristics. The light-emitting device drivers 275-1 to 275-N of FIG. 3 may apply the predetermined level of current $I_L$ to the respective LEDs 221 to 22N to control them. Here, since the LEDs 221 to 22N have a small internal resistance, resistors (not shown) may be connected in series in order to protect the devices from instantly applied high voltage.

In FIG. 3, VDD denotes a supply voltage; P1, P10, and P11 to P1(n) denote PMOS transistors; N1, N2, ..., N(n), N(n+1), and N11 to N1(n) denote NMOS transistors; Node(1) to Node (n) denote nodes; $I_G$ denotes a current generated by the constant current source 311; and $I_L$ denotes a current applied to the respective LEDs 221 to 22N.

When the light-emission control voltage $V_{GL}$ output from the light-emitting device driving unit 275 is at a low level, the PMOS transistor P1 of the light-emission flicker 271 is turned on in response to the second control signal con2 during the second time period. In addition, the supply voltage VDD is applied to all the LEDs 221 to 22N connected through the common terminal 250 and arranged outside, so that the LEDs 221 to 22N are turned on. On the other hand, when the light-emission control voltage $V_{GL}$ is at a high level, the PMOS transistor P1 is turned off. In addition, voltage is not applied to any of the LEDs 221 to 22N connected through the common terminal 250 and arranged outside, so that the LEDs 221 to 22N are turned off.

Whether or not the respective NMOS transistors N11 to N1(n) are turned on is determined according to respective voltage values VIL(1) to VIL(n) of the second control signals con2, and the current $I_G$ generated by the constant current source 311 is applied by the respective light-emitting device drivers 275-1 to 275-N. The current $I_G$ is applied to the respective nodes Node(1) to Node(n) through the respective PMOS transistors P11 to P1(n) having the same size as the PMOS transistor P10 and constituting current mirror circuits.

Here, by a high-level value among the voltage values VIL(1) to VIL(n) of the second control signals con2, the corresponding transistor among the NMOS transistors N11 to N1(n) is turned on, and the current $I_L$ is applied to the corresponding light-emitting device driver among the light-emitting device drivers 275-1 to 275-N. By an applied low-level value among the voltage values VIL(1) to VIL(n) of the second control signals con2, the corresponding transistor among the NMOS transistors N11 to N1(n) is turned off, and the current $I_L$ is not applied to the corresponding light-emitting device driver among the light-emitting device drivers 275-1 to 275-N.

The respective light-emitting device drivers 275-1 to 275-N constitute the current mirror circuits including pairs of the same-size NMOS transistors (N1, N2) to (N(n), N(n+1)). Thus, the same current as applied to the NMOS transistors N1 to N(n) is applied to the NMOS transistors N2 to N(n+1). The corresponding current is applied to the respective LEDs 221 to 22N through the I/O nodes 251 to 25N.

Therefore, according to the respective voltage values VIL(1) to VIL(n) of the second control signals con2, the respective light-emitting device drivers 275-1 to 275-N apply the predetermined level of current $I_L$ to the respective I/O terminals 251 to 25N during the second time period that is the light-emitting device control time period described in FIG. 2, and durations in which the current $I_L$ is applied to the LEDs 221 to 22N are adjusted. In this way, the color intensities of light emitted from the LEDs 221 to 22N are combined. In this exemplary embodiment, it is described that the light-emission flicker 271 is arranged in a touch sensor device 201, and the external control device 295 is arranged outside, but they can be arranged inside or outside as occasion demands. In addition, an LED is described as a light-emitting source, but can be replaced by another light-emitting source and a device for controlling one directional current, e.g., a diode.

FIG. 4 is a timing diagram showing operation of the touch sensor device of FIG. 2. Descriptions on the parts overlapping FIGS. 2 and 3 will not be repeated.

$I_L$ denotes the current applied to the respective LEDs 221 to 22N by the light-emitting device driving unit 275 of FIG. 2, $T_S$ corresponding to the first time period of FIG. 3 denotes a time period for touch recognition, and $T_L$ corresponding to the second time period of FIG. 3 denotes a time period for LED control. In addition, $T_{ON1}$ and $T_{ON2}$ denote time periods in which the corresponding LEDs are turned on, $T_{OFF1}$ and $T_{OFF2}$ denote time periods in which the corresponding LEDs are turned off during the LED control time period $T_L$, $V_{DD}$ denotes the supply voltage value, $I_{ON}$ denotes the level of current capable of turning on the LEDs, $I_{OFF}$ denotes the level of current capable of turning off the LEDs, and $V_L$ denotes a ground voltage. During the touch recognition time period $T_S$ and the LED control time period $T_L$, operation of the touch sensor device is the same as in FIG. 2.

Referring to a current 401, in order to respond to a touch when the touch is made during the touch recognition time period $T_S$ and to turn on one of the LEDs 221 to 22N of FIG. 2 during 50% $T_{ON1}$ of the LED control time period $T_L$, the light-emitting device driving unit 275 applies the predetermined level of current $I_{ON}$ to a terminal connected with the corresponding LED during the corresponding time period $T_{ON1}$. In addition, to turn off the corresponding LED during the remaining 50% $T_{OFF1}$ of the LED control time period $T_L$, the light-emitting device driving unit 275 applies another predetermined level of current $I_{OFF}$ to the terminal connected with the LED. Such change in the current 401 is repeated during the LED control time period $T_L$ after the touch recognition time period $T_S$.

According to another example of controlling the LEDs 221 to 22N, in order to adjust the brightness of light output from the LEDs 221 to 22N, in contrast to the current 401, a current 402 turns on one of the LEDs 221 to 22N of FIG. 2 for 30% $T_{ON2}$ of the LED control time period $T_L$ and turns it off for the remaining 70% $T_{OFF2}$ of the LED control time period $T_L$. Such an operation is repeated thereafter at time intervals from the touch recognition time period $T_S$ to the LED control time period $T_L$.

A current 403 corresponds to a case where no touch is made during the touch recognition time period $T_S$, in contrast to the currents 401 and 402 that the light-emitting device driving unit 285 outputs to the corresponding LED among the LEDs 221 to 22N. Here, the level of current $I_{OFF}$ for turn-off is applied to the light-emitting device during the LED control time period $T_L$, and thus the corresponding LED among the LEDs 221 to 22N is turned off. In this way, durations in which current is applied are determined according to the second control signals con2 output from the controller 285.

As described above, the touch sensor device, including a touch recognition function and a light-emitting device control function, connects external contact devices and light-emitting devices, respectively, through I/O terminals and controls them. Therefore, external devices respectively performing a plurality of functions are respectively connected to a limited number of common I/O terminals and controlled, so that a semiconductor device having a reduced amount of current consumed by I/O terminals is provided.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A touch sensor device, comprising:
   at least one terminal connected to at least one contact pad;
   at least one common terminal;
   at least one light emitter connected between the common terminal and the terminal; and
   a touch sensor and light-emission controller unit connected to the common terminal and the terminal, and when a touch is sensed by the contact pad, controlling a corresponding light emitter to emit light;
   wherein the touch sensor and light-emission controller unit comprises:
   a touch sensor for recognizing a signal applied to the terminal and outputting touch detection signals in response to a first control signal during a first time period;
   a light-emitting device controller for controlling a current to flow from the common terminal through a selected terminal in response to a second control signal during a second time period; and
   a controller for outputting the first control signal to the touch sensor and generating the second control signal in response to the touch detection signals;
   wherein the light-emitting device controller comprises:
   at least one light-emission flicker connected between a supply voltage and the common terminal, and connected with the light emitter; and
   a light-emitting device driving unit for making the current flow to the terminal and applying a light-emission control voltage to the light-emission flicker in response to the second control signals.

2. The touch sensor device of claim 1, wherein the touch sensor outputs the touch detection signals to the controller in response to the first control signal during the first time period, and outputs a high impedance value to the terminal in response to the second control signal during the second time period.

3. The touch sensor device of claim 2, wherein the touch sensor controls the contact pad not to output a signal in response to the second control signal during the second time period.

4. The touch sensor device of claim 1, wherein the light-emitting device controller comprises:
   at least one light-emission flicker arranged outside and close to the touch sensor device, connected to a supply voltage and the common terminal, and connected with the light emitter; and
   a light-emitting device driving unit for making the current flow from the common terminal to the terminal and applying the light-emission control voltage to the light-emission flicker in response to the second control signal.

5. The touch sensor device of claim 1, wherein the light-emission flicker comprises a p-type metal oxide semiconductor (PMOS) transistor turned on in response to the light-emission control voltage.

6. The touch sensor device of claim 1, wherein the light-emitting device driving unit outputs a high impedance value to the terminal in response to the first control signal during the first time period.

7. The touch sensor device of claim 6, wherein the light-emitting device driving unit comprises:
   a constant current source;
   a first p-type metal oxide semiconductor (PMOS) transistor connected between the supply voltage and the constant current source;
   a plurality of second PMOS transistors each constituting a current mirror circuit together with the first PMOS transistor and connected with the supply voltage; and
   a first n-type metal oxide semiconductor (NMOS) transistor connected to the respective second PMOS transistors and turned on in response to the second control signal.

8. The touch sensor device of claim 7, wherein the light-emitting device driving unit further comprises a light-emitting device driver comprising:
   a second NMOS transistor connected between the first NMOS transistor and a ground voltage; and
   a third NMOS transistor connected between the input/output (I/O) terminal and the ground voltage, and constituting a current mirror circuit together with the second NMOS transistor.

9. The touch sensor device of claim 8, wherein the light-emitting device driver applies a level of current with which the light emitter can emit light in response to the second control signal during the second time period.

10. The touch sensor device of claim 1, wherein the controller controls a duration in which the second control signal is maintained at a uniform value during the second time period in response to the touch detection signals or an external control signal.

11. The touch sensor device of claim 10, wherein the first time period is shorter than the second time period.

12. The touch sensor device of claim 11, wherein frequencies of the first control signal and the second control signal having a time interval consisting of the first and second time periods are higher than a frequency at which an ordinary person recognizes the time interval with his/her naked eye, in order to be seen as continuous light emission.

13. The touch sensor device of claim 12, wherein the controller is programmed to turn off the corresponding light emitter in response to the touch detection signals or the external control signal.

14. The touch sensor device of claim 1, wherein the touch sensor outputs the touch detection signals generated according to whether or not the contact pad senses pressure to the controller.

15. The touch sensor device of claim 1, wherein the light emitter comprises a light emitting diode (LED).

16. The touch sensor device of claim 1, wherein the light emitter comprises a light-emitting device, and a diode.

17. A touch sensor device, comprising:
    at least one terminal connected to at least one contact pad;
    at least one common terminal;
    at least one light emitter connected between the common terminal and the terminal;
    a touch sensor and light-emitting device controller unit recognizing a signal applied to the terminal and generating a touch detection signal in response to a first control signal, and controlling a current to flow through a selected terminal in response to a second control signal; and
    a controller generating the first and second control signals;
    wherein the controller outputs the first control signal to the touch sensor and light-emitting device controller unit at time intervals consisting of a first time period and a second time period and generates the second control signal in response to the touch detection signal;
    wherein the touch sensor and light-emitting device controller unit comprises:
    a touch sensor for recognizing the signal applied to the terminal and outputting the touch detection signal in response to the first control signal during the first time period; and
    a light-emitting device controller for controlling the current to flow from the common terminal through the selected terminal in response to the second control signal during the second time period;
    wherein the light-emitting device controller comprises:
    at least one light-emission flicker connected between a supply voltage and the common terminal, and connected with the light emitter; and
    a light-emitting device driving unit for making the current flow from the common terminal to the terminal and applying a light-emission control voltage to the light-emission flicker in response to the second control signal.

18. The touch sensor device of claim 17, wherein the touch sensor outputs the touch detection signal to the controller in response to the first control signal during the first time period, and outputs a high impedance value to the terminal in response to the second control signal during the second time period.

19. The touch sensor device of claim 18, wherein the touch sensor controls the contact pad not to output a signal in response to the second control signal during the second time period.

20. The touch sensor device of claim 18, wherein the touch sensor outputs the touch detection signal generated according to whether or not the contact pad senses pressure to the controller.

21. The touch sensor device of claim 17, wherein the light-emitting device controller comprises:
    at least one light-emission flicker arranged outside and close to the touch sensor device, connected to a supply voltage and the common terminal, and connected with the light emitter; and
    a light-emitting device driving unit making the current flow from the common terminal to the terminal and applying the light-emission control voltage to the light-emission flicker in response to the second control signal.

22. The touch sensor device of claim 17, wherein the light-emission flicker has a p-type metal oxide semiconductor (PMOS) transistor turned on in response to the light-emission control voltage.

23. The touch sensor device of claim 17, wherein the light-emitting device driving unit outputs a high impedance value to the terminal in response to the first control signal during the first time period.

24. The touch sensor device of claim 23, wherein the light-emitting device driving unit comprises:
    a constant current source;
    a first p-type metal oxide semiconductor (PMOS) transistor connected between the supply voltage and the constant current source;
    a plurality of second PMOS transistors each constituting a current mirror circuit together with the first PMOS transistor and connected with the supply voltage; and
    a first n-type metal oxide semiconductor (NMOS) transistor connected to the respective second PMOS transistors and turned on in response to the second control signal.

25. The touch sensor device of claim 24, wherein the light-emitting device driving unit further comprises a light-emitting device driver comprising:
    a second NMOS transistor connected between the first NMOS transistor and a ground voltage; and
    a third NMOS transistor connected between the input/output (I/O) terminal and the ground voltage, and constituting a current mirror circuit together with the second NMOS transistor.

26. The touch sensor device of claim 25, wherein the light-emitting device driver applies a level of current with which the light emitter can emit light in response to the second control signal during the second time period.

27. The touch sensor device of claim 17, wherein the controller controls a duration in which the second control signal is maintained at a uniform value during the second time period in response to the touch detection signal or an external control signal, wherein the controller controls a duration in which the second control signal is maintained at a uniform value during the second time period in response to the touch detection signal or an external control signal.

28. The touch sensor device of claim 27, wherein the first time period is shorter than the second time period.

29. The touch sensor device of claim 28, wherein frequencies of the first control signal and the second control signal having a time interval consisting of the first and second time periods are higher than a frequency at which an ordinary person can recognize the time interval with his/her naked eye, in order to be seen as continuous light emission.

30. The touch sensor device of claim 29, wherein the controller is programmed to turn off the corresponding light emitter in response to the touch detection signal or the external control signal.

31. The touch sensor device of claim 17, wherein the light emitter comprises:
a light emitting diode (LED).

32. The touch sensor device of claim 17, wherein the light emitter comprises:
a light-emitting device; and
a diode.

* * * * *